US011620780B2

(12) United States Patent
Lee et al.

(10) Patent No.: US 11,620,780 B2
(45) Date of Patent: Apr. 4, 2023

(54) MULTIPLE DEVICE SENSOR INPUT BASED AVATAR

(71) Applicant: Microsoft Technology Licensing, LLC, Redmond, WA (US)

(72) Inventors: Austin S. Lee, Seattle, WA (US); Kenneth Mitchell Jakubzak, Lynnwood, WA (US); Mathew J. Lamb, Seattle, WA (US); Alton Kwok, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 73 days.

(21) Appl. No.: 16/951,339

(22) Filed: Nov. 18, 2020

(65) Prior Publication Data

US 2022/0156998 A1    May 19, 2022

(51) Int. Cl.
*G06T 13/40* (2011.01)
*G06N 20/00* (2019.01)
*G06T 7/73* (2017.01)
*G02B 27/01* (2006.01)
*G06T 15/04* (2011.01)

(Continued)

(52) U.S. Cl.
CPC .......... *G06T 13/40* (2013.01); *G02B 27/0101* (2013.01); *G02B 27/0172* (2013.01); *G06N 20/00* (2019.01); *G06T 7/75* (2017.01); *G06T 15/04* (2013.01); *G06T 15/205* (2013.01); *G06T 19/006* (2013.01); *G02B 2027/0138* (2013.01); *G02B 2027/0174* (2013.01); *G06T 2207/10016* (2013.01); *G06T 2207/10028* (2013.01); *G06T 2207/20081* (2013.01); *G06T 2207/30201* (2013.01)

(58) Field of Classification Search
None
See application file for complete search history.

(56) References Cited

U.S. PATENT DOCUMENTS

2014/0125698 A1   5/2014  Latta et al.
2014/0267410 A1*  9/2014  Fein .................. G06Q 30/0641
                                              345/633

(Continued)

OTHER PUBLICATIONS

"International Search Report and Written Opinion Issued in PCT Application No. PCT/US21/052492", dated Dec. 20, 2021, 10 Pages.

*Primary Examiner* — Kyle Zhai
(74) *Attorney, Agent, or Firm* — Alleman Hall Creasman & Tuttle LLP

(57) ABSTRACT

Examples are disclosed that relate to utilizing image sensor inputs from different devices having different perspectives in physical space to construct an avatar of a first user in a video stream. The avatar comprises a three-dimensional representation of at least a portion of a face of the first user texture mapped onto a three-dimensional body simulation that follows actual physical movement of the first user. The three-dimensional body simulation of the first user is generated based on image data received from an imaging device and image sensor data received from a head-mounted display device both associated with the first user. The three-dimensional representation of the face of the first user is generated based on the image data received from the imaging device. The resulting video stream is sent, via a communication network, to a display device associated with a second user.

18 Claims, 11 Drawing Sheets

(51) Int. Cl.
*G06T 15/20* (2011.01)
*G06T 19/00* (2011.01)

(56) References Cited

U.S. PATENT DOCUMENTS

| | | | |
|---|---|---|---|
| 2018/0158246 A1 | 6/2018 | Grau et al. | |
| 2018/0174347 A1* | 6/2018 | Chaney | H04N 9/3194 |
| 2018/0252922 A1* | 9/2018 | Fujimaki | A63F 13/5255 |
| 2019/0251892 A1* | 8/2019 | Stoll | G06F 3/011 |
| 2020/0265627 A1* | 8/2020 | Seo | H04N 5/2621 |
| 2020/0322395 A1* | 10/2020 | Copley | H04N 7/157 |
| 2021/0132683 A1* | 5/2021 | Herling | G06V 10/44 |

\* cited by examiner

MULTIPLE DEVICE SENSOR INPUT BASED AVATAR

BACKGROUND

An avatar may be used to represent a human subject to remote participants in computing experiences, such as virtual reality or mixed reality experiences.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to utilizing multiple image sensor inputs from different devices having different perspectives in physical space to construct an avatar of a first user in a video stream for presentation in virtual or augmented reality communication. The avatar comprises a three-dimensional representation of at least a portion of a face of the first user texture mapped onto a three-dimensional body simulation that follows actual physical movement of the first user. The three-dimensional body simulation of the first user is generated based on image data received from an imaging device and image sensor data received from a head-mounted display device both associated with the first user. The three-dimensional representation of the face of the first user is generated based on the image data received from the imaging device. The resulting video stream is sent, via a communication network, to a display device associated with a second user.

DETAILED DESCRIPTION

Figure 1:
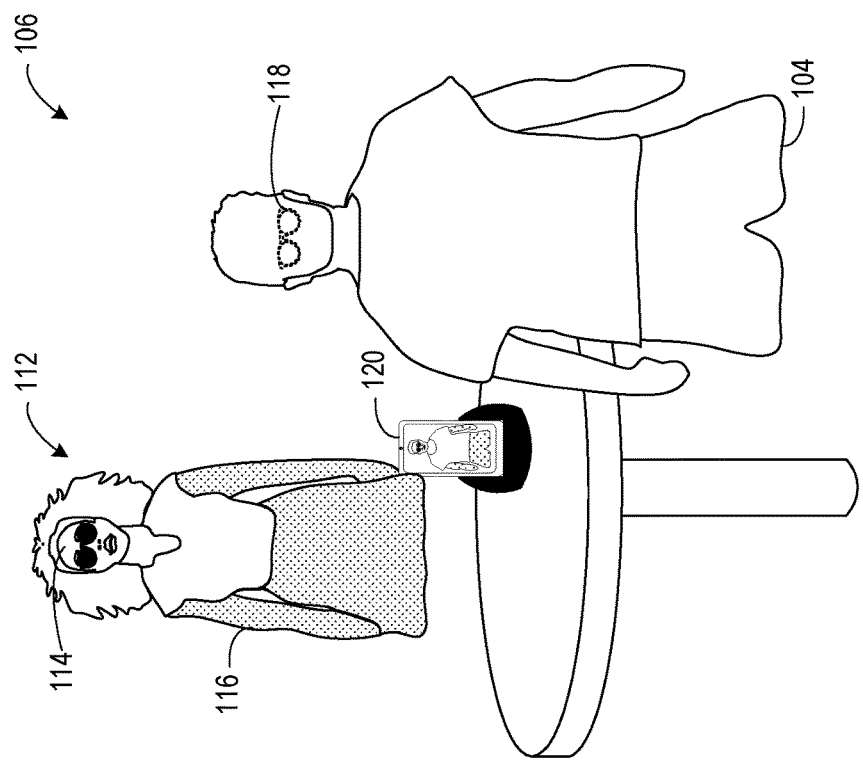
FIG. 1 shows an example mixed reality teleconference between two remotely located users.
Figure 1:
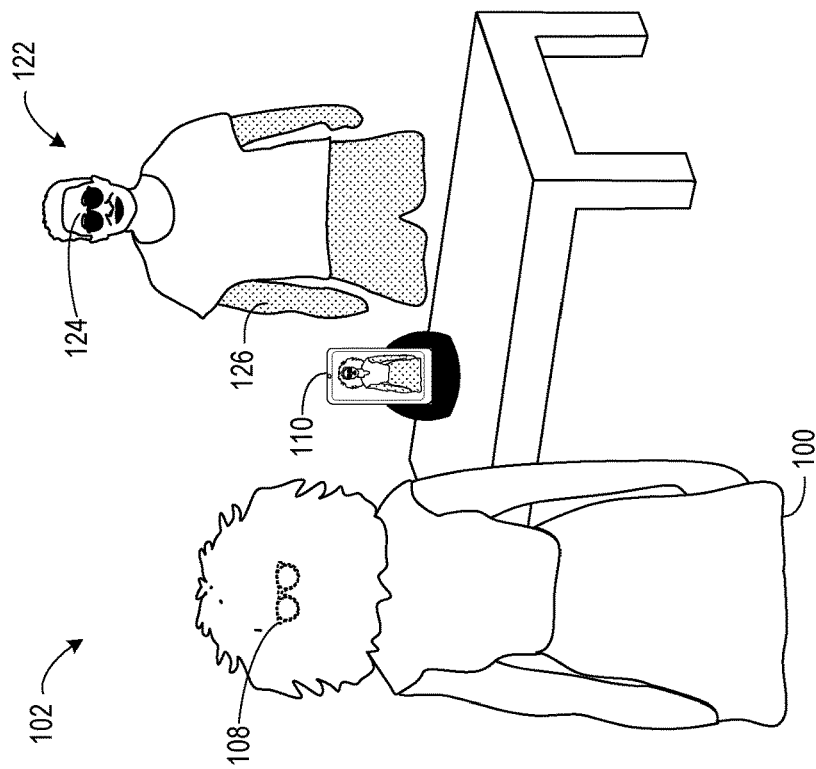

Virtual reality and mixed reality display devices may be used to present immersive visual experiences in which displayed three-dimensional virtual objects appear to exist in a same three-dimensional physical space as a device user. However, it may be challenging to present video-based communications in an immersive manner. For example, a virtual or mixed reality display in the form of a head-mounted display may lack cameras that image a user's entire face as the user speaks, and thus may not provide an output of video data suitable to send to a remote user for a video conference. To overcome this issue, an external camera (e.g. a phone camera or webcam) may be used to acquire video data of the user during a video conference. However, the resulting stream of two-dimensional video data lacks three-dimensional characteristics, and would detract from the immersive nature of a virtual or augmented reality experience if presented as a flat video image by the receiving device.

As another approach, an avatar may be used to represent a remote participant in virtual reality or mixed reality communication between multiple users. An avatar may be represented as a three-dimensional virtual object, and thus may provide for a more immersive virtual or mixed reality experience than the display of two-dimensional video data. However, current mixed or virtual reality avatars may not represent the actual appearance of the face of the other user or body movements of the other user accurately.

Accordingly, examples are disclosed that leverage multiple image sensor inputs from different devices having different perspectives in physical space to construct an avatar of a first user in a video stream. The avatar comprises a three-dimensional representation of at least a portion of a face of the first user texture mapped onto a three-dimensional body simulation that follows actual physical movement of the first user. The three-dimensional body simulation of the first user is generated based on image data received from an imaging device and image sensor data received from a head-mounted display device both associated with the first user. The three-dimensional representation of the face of the first user is generated based on the image data received from the imaging device. The resulting video stream is sent, via a communication network, to a display device associated with a second user for presentation as a holographic avatar.

The sensor inputs from multiple devices associated with a user and having different perspectives in a physical space may collectively provide information about the user with a sufficient level of specificity to permit the generation of an avatar that is a three-dimensional volumetric representation of the user that follows actual movement of the user in the physical space. Additionally, since the avatar is generated by texture mapping the three-dimensional representation of the user onto the three-dimensional body simulation, the avatar may accurately capture nuanced human behaviors, such as facial expressions and hand gestures of the user. Such an avatar is generated in a video stream that may be incorporated in a virtual reality or mixed reality experience, such as a virtual reality or mixed reality teleconference between multiple users.

FIG. 1 shows an example mixed reality teleconferencing scenario between a first user 100 in a first physical space 102 and a second user 104 in a second physical space 106 remote from the first physical space 102. The first user 100 is wearing a first head-mounted display device 108 comprising an outward-facing image sensor that images the first physical scene 102 from the perspective of the first user 100. With the outward-facing image sensor, the first head-mounted display device 108 may image various body parts (e.g., hands) of the first user 100 that enter a field of view of one or more cameras of the first head-mounted display device 108. A first imaging device 110 that is separate from the first head-mounted display device 108 images a face of the first user 100 from a different perspective in the first physical space 102 than the first head-mounted display device 108. The image data from the first head-mounted display device 108 and the first imaging device 110 are sent to a remote computing system (not shown in FIG. 1) that is configured to generate an audio/video stream including a first avatar 112 of the first user 100. The first avatar 112 is formed by texture mapping a three-dimensional representation of at least a portion of the first user's face 114 onto a three-dimensional body simulation 116 that follows actual physical movement of the first user 100. In the illustrated example, an example three-dimensional representation 114 is depicted with a solid fill pattern and an example three-dimensional body simulation 116 is depicted with a dotted fill pattern for ease of illustration. In practice, the avatar may take a different form.

The remote computing system sends the audio/video stream that includes the first avatar 112 to a second head-mounted display device 118 worn by the second user. The second head-mounted display device 118 presents the audio/video stream such that the first avatar 112 appears holographically projected into the second physical space 106. The first avatar 112 has a three-dimensional volumetric lifelike appearance that follows actual physical movement of the first user 100.

Additionally, the remote computing system may send the audio/video stream that includes the first avatar 112 to first imaging device 110 and the first imaging device displays the first avatar to the first user 100. In this way, the first user 100 is provided with virtual feedback of the first avatar 112. In other examples, the first imaging device 110 may act as a viewfinder by visually presenting image of the first user 100 captured by the first imaging device 110.

The mixed reality teleconference occurs in the same or similar manner from the perspective of the second user 104. Image data is generated by an outward-facing image sensor of the second head-mounted display device 118. Additionally, a second imaging device 120 images the second user's face. The image data from the second head-mounted display device 118 and the second imaging device 120 are sent to the remote computing system.

The remote computing system sends an audio/video stream that includes a second avatar 122 to the first head-mounted display device 108 worn by the first user 100. The second avatar 122 is formed by texture mapping a three-dimensional representation of at least a portion of the second user's face 124 onto a three-dimensional body simulation 126 that follows actual physical movement of the second user 104. The second head-mounted display device 118 presents the audio/video stream such that the second avatar 122 appears holographically projected into the first physical space 102. The second avatar 122 has a three-dimensional volumetric lifelike appearance that follows actual physical movement of the second user 104.

The illustrated scenario is meant to be non-limiting. Any suitable number of two or more devices may capture image data of a user that may be collectively used to generate an avatar representing the user in a virtual reality or mixed reality teleconference or other virtual reality or mixed reality experience.

Figure 2:
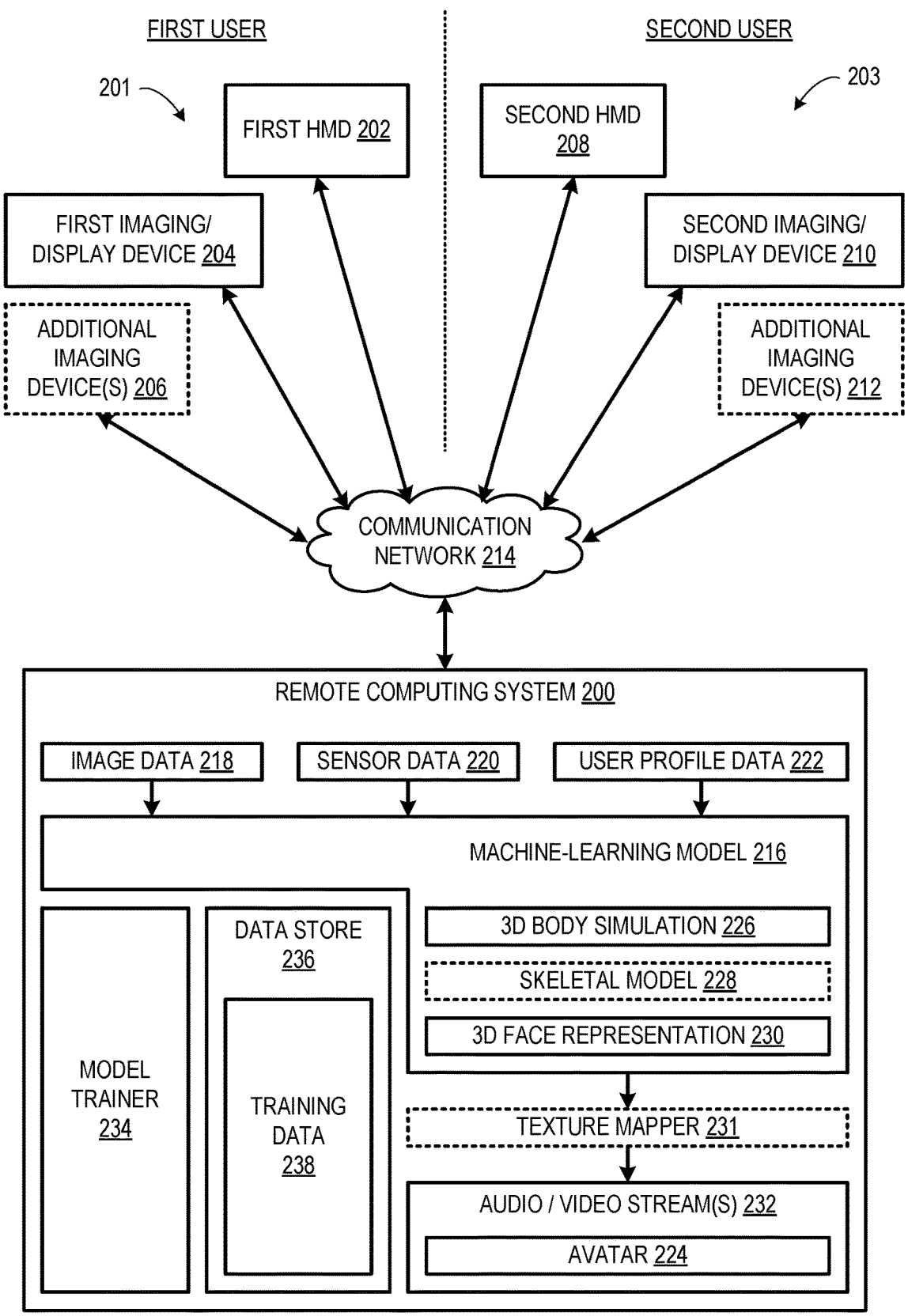
FIG. 2 shows an example computing system that is configured to facilitate virtual reality or mixed reality teleconferencing between remotely located users.

FIG. 2 shows an example computing system 200 that is configured to facilitate virtual reality or mixed reality video teleconferencing between remote users. In the illustrated example, a first user is associated with a first plurality of devices 201 including a first head-mounted display device 202, a first imaging/display device 204, and optionally one or more additional imaging devices 206. The first plurality of devices 201 associated with the first user may be positioned within a first physical space where the first user resides, such that the first plurality of devices 201 may image or otherwise sense the first user from different perspectives in the first physical space. The plurality of devices 201 are referred to as being associated with the first user because image data and other sensor data captured by these devices characterize information about the first user, and such data is used together to generate an avatar representing the first user in a virtual reality or mixed reality experience.

As mentioned above, the first head-mounted display device 202 comprises at least one outward facing camera configured to image the first physical space to generate image data. Additionally, the outward facing camera may image parts of the first user's body that enter a field of view of the camera, such as the first user's hands. The camera may take any suitable form. For example, the camera may comprise a monochrome camera or a color (e.g., RGB) camera. In some implementations, the first head-mounted display device 202 may further comprise one or more additional cameras including, but not limited, a depth camera, an infrared camera, a thermal camera, and/or another type of camera. In some implementations, the first head-mounted display device 202 may further comprise other sensors configured to sense various characteristics of the first user. For example, in some implementations, the first head-mounted display device 202 may further comprise a motion sensor configured to help determine a position of the first user in the first physical space. As another example, the first head-mounted display device 202 may further comprise a microphone configured to capture audio data.

The first imaging/display device 204 may take any suitable form of device that is separate from the first head-mounted display device 202 and comprises a camera useable to image the first user from a different perspective than the first head-mounted display device 202. The camera may take any suitable form. For example, the camera may comprise a monochrome camera or a color (e.g., RGB) camera. In some implementations, the first imaging/display device 204 may further comprise one or more additional cameras including, but not limited, a depth camera, an infrared camera, a thermal camera, and/or another type of camera.

Additionally, in some implementations, the first imaging/display device 204 comprises a display. In some examples, the first imaging/display device 204 may be configured to display an avatar representing the first user, so that the first user is provided with visual feedback of their augmented appearance. Likewise, in some examples, the first imaging/display device 204 may be configured to display an avatar representing the second user. For example, such a scenario may occur when the first user is not wearing the first head-mounted display device 202 and is instead communicating using the first imaging/display device 204. The first imaging/display device 204 may take any suitable form including, but not limited to, a smartphone, a tablet, a laptop computer, a desktop computer, a smart television, an interactive touch display, or another type of imaging/display device. In some implementations, the first imaging/display device 204 may comprise separate devices—e.g., a dedicated camera and a dedicated display device.

The additional imaging device(s) 206, where used, may be positioned in the first physical space to image the first user from additional perspective(s) different than the perspective of the first head-mounted display device 202 and different than the perspective of the first imaging/display device 204. Any suitable number of additional devices optionally may provide image data and/or other sensor data that may be used to form an avatar of the first user.

The image sensors included in the first plurality of devices 201 may take any suitable form, including monochrome cameras, color (e.g., RGB) cameras, depth cameras (e.g., time-of-flight, structured light), thermal cameras, infrared cameras, and other types of cameras. In some implementations, the first plurality of devices 201 may include additional sensors that provide additional information about the first user, such as motion sensors, microphones, thermal sensors, and other sensors.

In some implementations, one or more of the first plurality of devices 201 may be paired with one or more other devices of the first plurality of devices 201. For example, such pairing of devices may allow for coordinated sensing of the first user in the first physical space. Also, such pairing of devices may allow for coordinated sensing of the structure of the first physical space itself. In some examples, such pairing of devices may allow for image data and/or other sensor data to be indirectly sent to the remote computing system 200. For example, image data captured by a camera of the first head-mounted display device 202 may be sent to the first imaging/display device 204, and the first imaging/display device 204 may relay the image data from the first head-mounted display device 202 to the remote computing system 200 via a communication network 214. As another example, the first head-mounted display device 202 may relay image data captured by the first imaging/display device 204 to the remote computing system via the communication network 214. In other examples, the first head-mounted display device 202 and the first imaging/display device 204 each may send image data directly to the remote computing system 200 via the communication network 214.

A second user is located in a second physical space remote from the first user in the first physical space. The second user is associated with a second plurality of devices 203 including a second head-mounted display device 208, a second imaging/display device 210, and optionally one or more additional imaging devices 212. The second plurality of devices 203 associated with the second user may be configured in a same or similar manner as the first plurality of devices 201, but with respect to imaging and/or otherwise sensing the second user in the second physical space instead of the first user in the first physical space.

The remote computing system 200 is configured to communicate with the first plurality of devices 201 and the second plurality of devices 203 via a communication network 214, such as the Internet. The remote computing system 200 comprises a machine-learning model 216 that is configured to facilitate conducting virtual reality or mixed reality experiences between multiple users, such as the first user and the second user. In one example, the remote computing system 200 is configured to receive, via the communication network 214, image data 218 from the first plurality of devices 201. In some examples, image data 218 may include raw image frames. In other examples, the image data 218 may include processed image data, such as depth data from a depth camera. In some examples, other image processing operations may be performed locally on a camera or other device prior to the processed image data being sent to the remote computing system 200. For example, feature recognition, skeletal modeling, spatial mapping, and/or other image processing operations may be performed locally, and such processed image data may be sent to the remote computing system 200.

Optionally, in some implementations, the remote computing system 200 may be configured to receive, via the communication network 214, sensor data 220 from the first plurality of devices 201. In some examples, such sensor data 220 may include non-image data, such as audio data, motion data, spatial mapping data, and/or other types of sensor data. Further, in some implementations, the remote computing system 200 may be configured to receive, via the communication network 214, user profile data 222 corresponding to the first user. The user profile data 222 may include information about the personal preferences of the first user in regard to customizing an appearance of an avatar 224 that is generated by the machine-learning model 216 to represent the first user in the virtual reality or mixed reality teleconference. For example, the user profile data 222 may specify physical features of the avatar 224 including but not limited to skin color, hair color, eye color, body type, clothing, virtual accessories, and other physical features.

Figure 3:
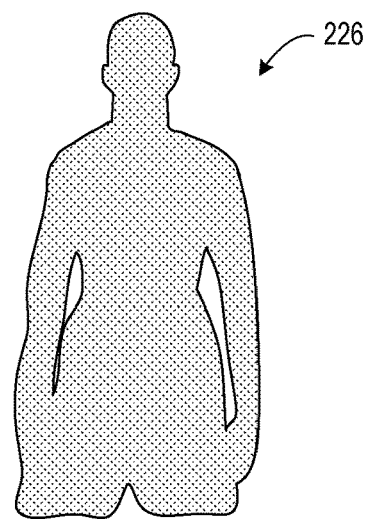
FIG. 3 shows an example representation of three-dimensional body simulation of a user.

As mentioned above, the machine-learning model 216 is configured to generate a three-dimensional body simulation 226 of the first user's body based on the image data received from the first plurality of device 201. FIG. 3 shows an example representation of the three-dimensional body simulation 226. The three-dimensional body simulation 226 of the first user's body follows actual physical movement of the first user's body. In one example, the machine-learning model 216 is configured to generate the three-dimensional body simulation 226 based on at least image sensor data received from the first head-mounted display device 202 that indicates a hand position relative to the head position of the first user. From such data, a three-dimensional pose of the first user's body may be inferred. In another example, the machine-learning model 216 is configured to generate the three-dimensional body simulation 226 based on image sensor data received from the first head-mounted display device 202 and image data received from the first imaging/display device 204. For example, the machine-learning model 216 may be configured to spatially register image data from both devices (and optionally additional imaging devices) to determine the three-dimensional position of the first user's body in the first physical space.

Figure 4:
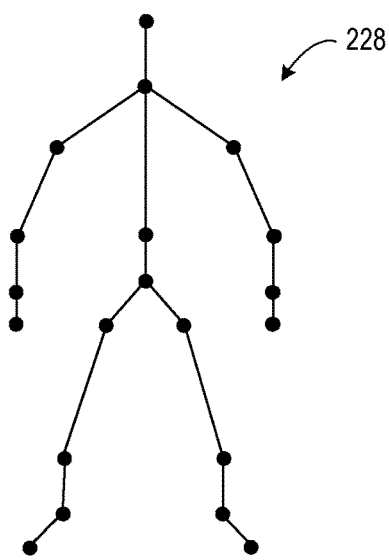
FIG. 4 shows an example representation of a skeletal model of a user.

In some implementations, where the machine-learning model 216 receives depth data from a depth camera of the first imaging/display device 204, the machine-learning model 216 optionally may be configured to generate a skeletal model 228 of a body of the first user based on such depth data. FIG. 4 shows an example representation of the skeletal model 228. Further, the machine-learning model 216 may be configured to generate the three-dimensional body simulation 226 based on the skeletal model 228.

Figure 5:
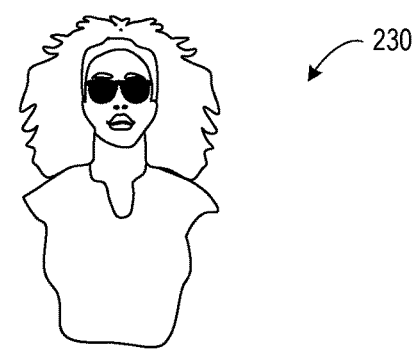
FIG. 5 shows an example representation of a three-dimensional point cloud of a face of a user.

The machine-learning model 216 is further configured to generate a three-dimensional representation 230 of at least a portion of a face of the first user based on the image data received from the first imaging/display device 204. In some examples, the dimensional representation 230 comprises a three-dimensional point cloud. FIG. 5 shows an example representation of the three-dimensional point cloud 230. The three-dimensional point cloud provides a volumetric representation of the first user's face that may capture real-time facial expressions and gestures of the first user. In some examples, the three-dimensional point cloud may include the entire face, the entire head, and/or additional parts of the first user's body. In other examples, the three-dimensional representation of the user's face may take another form, such as a polygon mesh or another volumetric representation.

Optionally, in some implementations, the avatar 224 may be augmented or modified to include any suitable virtual content to enhance the mixed reality experience of the teleconference. In some examples, such virtual content optionally may be set by personal preferences of the first user based on the user profile data 222.

In some implementations, the machine-learning model 216 may be configured to generate an audio/video stream 232 comprising the avatar 224 of the first user. The avatar 224 of the first user is formed by texture mapping the three-dimensional representation 230 of the first user's face onto the three-dimensional body simulation 226 of the first user's body. In other implementations, the machine-learning model 216 may be configured to generate the three-dimensional body simulation 326 (and optionally the skeletal model 228) and a texture mapper 231 may be configured to form the avatar 224 of the first user by texture mapping the three-dimensional representation 230 of the first user's face onto the three-dimensional body simulation 226 of the first user's body.

The resulting avatar 224 has a volumetric three-dimensional appearance of the first user that provides lifelike facial expressions and gestures and follows physical movement of the first user. In some implementations, the entire avatar 224 visually presented in the audio/video stream 232 may be texture mapped with the three-dimensional representation 230 of the first user. In other implementations, a portion of the avatar 224 may be texture mapped with the three-dimensional representation 230 of the first user and the other non-textured mapped portion of the avatar 230 may be simulated using other techniques. In some implementations, the non-texture mapped portion of the avatar 224 may be fit to a default shaped body model. In other implementations, the non-texture mapped portion of the avatar 224 may be fit to a body model having customized physical features that correspond to the first user. For example, such customized physical features may be indicated by the user profile data 222.

The audio/video stream 232 may include substantially real-time audio data captured while the first user is speaking and sent to the remote computing system 200 as sensor data 220. The remote computing system 200 may be configured to synchronize the captured audio data with the avatar 224, such that the avatar appears to speak when the first user speaks.

In some implementations, the audio/video stream 232 may include video data in the form of a stream of image frames. In some implementations, the stream of image frames may be tagged with metadata that provide additional information about the avatar 224. For example, the metadata may include depth data for different pixels or objects in the image frames. Such depth data may be used to size and position the avatar 224 when visually presenting the avatar 224 on a head-mounted display device.

The machine-learning model 216 can be previously trained to generate a three-dimensional body simulation that follows actual movement of a user in a physical space and generate an audio/video stream including an avatar generated by texture mapping a three-dimensional representation of the user's face onto the three-dimensional body simulation. Alternatively, in some implementations, a texture mapper (e.g. texture mapper 231) may be used to texture map a three-dimensional representation of the user's face onto the three-dimensional body simulation in a separate process from the generation of the body simulation. The machine-learning model 216 can employ any suitable combination of state-of-the-art and/or artificial intelligence (AI) techniques, including machine learning (ML) techniques, to generate a three-dimensional body simulation of a user. Examples of such techniques include convolutional neural networks (e.g., including spatial convolutional networks for processing images and/or videos), multi-layer neural networks, recurrent neural networks (e.g., long short-term memory networks), support vector machines, associative memories (e.g., lookup tables, hash tables, Bloom Filters, Neural Turing Machine and/or Neural Random Access Memory), unsupervised spatial and/or clustering methods (e.g., nearest neighbor algorithms, topological data analysis, and/or k-means clustering) and/or graphical models (e.g., Markov models, conditional random fields, and/or AI knowledge bases).

The machine-learning model 216 is previously trained by a model trainer 234 executed on the remote computing system 200. The model trainer 234 can be configured to train the machine-learning model 216 based on training data 238 stored in a data store 236 of the remote computing system. The model trainer 234 can be configured to train the machine-learning model 216 according to any suitable training procedure. Non-limiting examples of training procedures for the machine-learning model 216 include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or based on generative adversarial neural network training methods. The machine-learning model 216 can be trained via supervised training on labeled training data 238 comprising a set of images having a same structure as an input image. In other words, the training data comprises the same type of images as the images generated by the plurality of devices (e.g. image data from an outward-facing image sensor of an HMD for body pose prediction). The set of training data 238 can be labeled with labels indicating different body parts and/or body positions. The machine-learning model 216 can be trained via supervised training on the set of training data 238 with regard to an objective function measuring an accuracy, precision, and/or recall of identifying and simulating different body poses as compared to actual body poses of actual human subjects indicated in the labeled training data.

In some implementations, the machine-learning model 216 can be configured as a service that an imaging device or a display device can call upon via one or more application programming interfaces (APIs).

The remote computing system 200 is configured to send, via the communication network 214, the audio/video stream 232 to one or more display devices. For example, when the remote computing system 200 generates an audio/video stream including an avatar representing the first user, the remote computing system 200 may send the audio/video stream to the second head-mounted display device 208 and/or the second imaging/display device 210 depending on which device the second user is viewing for the mixed reality teleconference. Additionally, the remote computing system 200 may be configured to send, via the communication network 214, the audio/video stream to the first imaging/display device 204 to provide visual feedback to the first user of the avatar representing the first user. The remote computing system 200 further may perform the converse when generating an avatar representing the second user. It will be appreciated that the remote computing system 200 may be configured to facilitate a virtual reality or mixed reality teleconference between more than two users, such as three, four, or more users.

In some examples, multiple users may use head-mounted display devices to view a mixed reality teleconference. Referring back the example scenario shown in FIG. 1, both the first user and the second user view the mixed reality teleconference using head-mounted display devices. In some examples, one user may use a head-mounted display device and another user may use a different type of imaging/display device (e.g., smartphone, tablet) to view the mixed reality teleconference.

In some implementations, depending on the capabilities of the display device, the depiction of the avatar 224 may vary in the audio/video stream 232 generated by the remote computing system 200. For example, the display capabilities of a display device (e.g., two-dimensional display, three-dimensional virtual reality display, three-dimensional see-through display) may be sent to the remote computing system 200 and the remote computing system 200 may generate the audio/video stream 232 including the avatar 224 according to the capabilities of the display device. As one example, for a head-mounted display device, the avatar 224 may be formed by texture mapping a three-dimensional point cloud onto a three-dimensional body simulation. As another example, for a smartphone, the avatar may be downscaled to a texture mapped version of the point cloud without the three-dimensional body simulation—e.g., a floating talking head, or further yet, the avatar may be downscaled to a two dimensional representation.

Figure 6B:
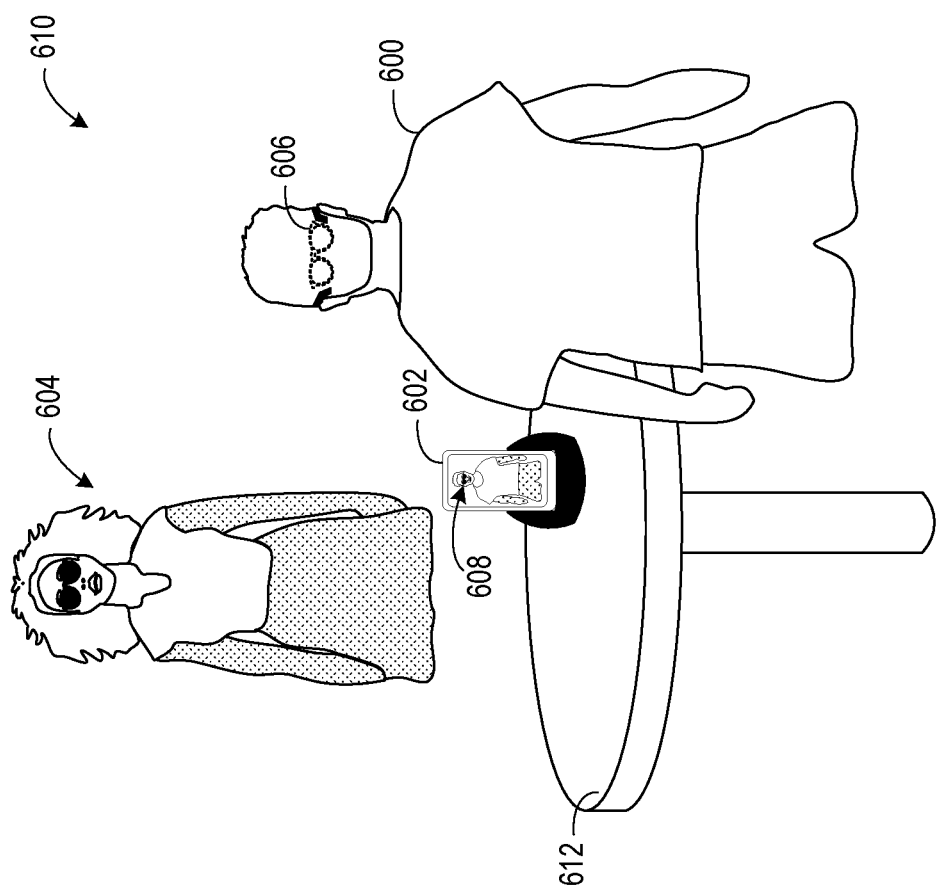
FIGS. 6A and 6B show an example scenario where a user switches from using a hand-held display device to a head-mounted display device during a mixed reality teleconference.
Figure 6A:
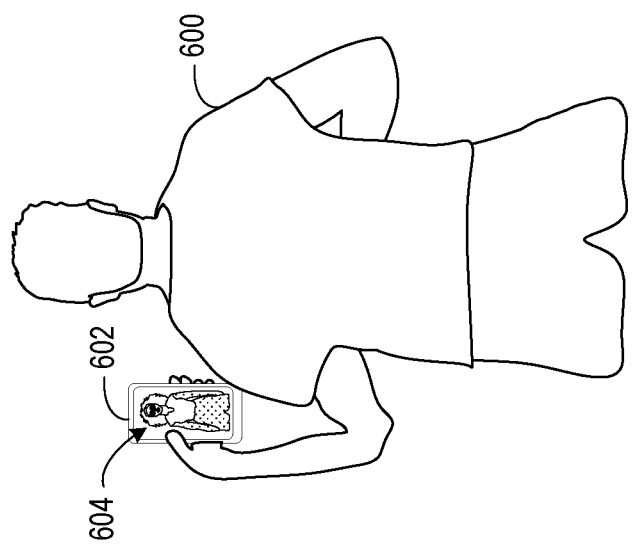

In some implementations, the remote computing system 200 may automatically vary the appearance of the avatar 224 in the audio/video stream 232 based on a user switching between different display devices to view the mixed reality teleconference. FIGS. 6A and 6B show an example scenario where a user switches from using a hand-held display device to a head-mounted display device during a mixed reality teleconference. In FIG. 6A, a first user 600 participates in a mixed reality teleconference by viewing a video stream visually presented on a two-dimensional display of a hand-held display device 602. The video stream includes an avatar 604 representing a second user. The second user is using a head-mounted display device and a secondary imaging device to participate in the mixed reality teleconference. The secondary imaging device is separate from the head-mounted display device and images the second user's face, such that the avatar 604 is formed by texture mapping a three-dimensional representation of the second user onto a three-dimensional body simulation of the second user's body in the manner described herein.

In some examples, when the first user 600 is viewing the video stream on the hand-held display device 602 and the hand-held display device 602 is imaging the first user 600, from the perspective of the second user, the first user 600 may be virtually represented as a flat two-dimensional image that is holographically presented to the second user. In some other examples where the hand-held display device 602 includes a depth camera that images the first user 600 while the first user 600 is viewing the video stream, the first user 600 may be represented by a volumetric three-dimensional representation (e.g., a floating talking head) that is holographically projected into the physical space of the second user.

In FIG. 6B, the first user 600 transitions from viewing the video stream on the hand-held display device 602 to viewing the video stream on a head-mounted display device 606. In response to being activated, the head-mounted display device 606 may send an indication of the activation to the remote computing system 200 via the communication network 214 (shown in FIG. 2). Further, in response to receiving the indication of activation from the head-mounted display device 606, the remote computing system 200 automatically sends, via the communication network, the video stream to the head-mounted display device 606. As such, the video stream automatically transitions from being visually presented on the hand-held display device 602 to being visually presented on the head-mounted display device 606 in response to activation of the head-mounted display device 606. As depicted, the avatar 604 representing the second user appears holographically projected into the physical space of the first user 600 when visually presented on the head-mounted display device 606. Additionally, a video stream including an avatar 608 representing the first user 600 is visually presented on the hand-held display device 602 to provide visual feedback of the first user 600.

After the first user begins using both the head-mounted display device 606 and the hand-held display device 602 that is acting as an imaging device, from the perspective of the second user, the first user 600 may be represented by a volumetric three-dimensional avatar 608 that is formed by texture mapping a three-dimensional representation of the first user 600 onto a three-dimensional body simulation of the first user's body. The avatar 608 representing the first user may appear holographically projected into the physical space of the second user, since the second user is also using a head-mounted display device.

In some implementations, motion of an avatar in a video stream may be bound by spatial limitations of a physical space that may be determined based on depth data provided by imaging devices that image the physical space. For example, in FIG. 6B, the head-mounted display device 606 (and optionally the hand-held display device 602) may generate depth data characterizing the structure of the physical space 610, such as a table 612 positioned in front of the first user 600 in the physical space 610. Although the structure in the physical space 610 may not be directly represented in a video stream sent to the second user, the avatar 608 representing the first user 600 may be bound by spatial limitations of the physical space 610. For example, the avatar 608 can be prevented from being positioned in the physical space of the second user at a position corresponding to the table 612, because the first user 600 could not physically stand in the middle of the table 612 in the physical space 610. Similarly, the avatar 608 may be bound by other spatial limitations of the physical space 610. For example, the avatar 608 can be prevented from walking through walls corresponding to the physical space 610. Additionally, in some examples, other mixed reality augmentation associated with the avatar 608 may be bound by the spatial limitations of the physical space 610.

In some implementations, the machine-learning model 216 may be configured to generate the video stream 232 such that the appearance of the avatar 224 varies based on a position of the user relative to the imaging device that images the user in the physical space.

Figure 7A:
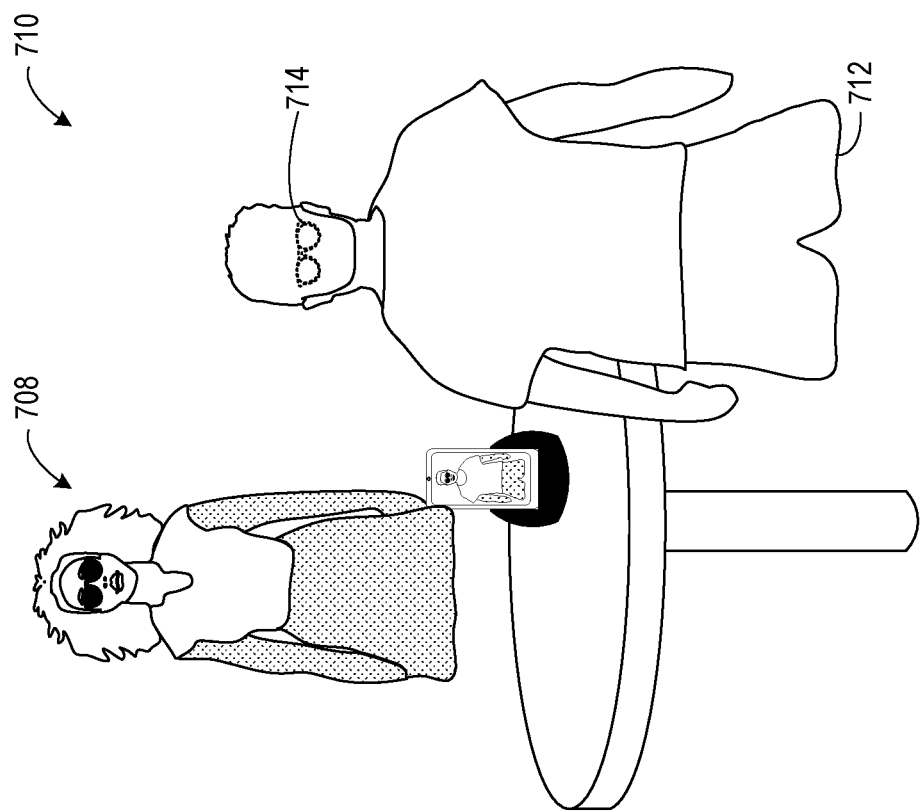
FIGS. 7A and 7B show an example scenario where presentation of an avatar varies based on a user moving beyond a threshold distance from an imaging device during a mixed reality teleconference.
Figure 7A:
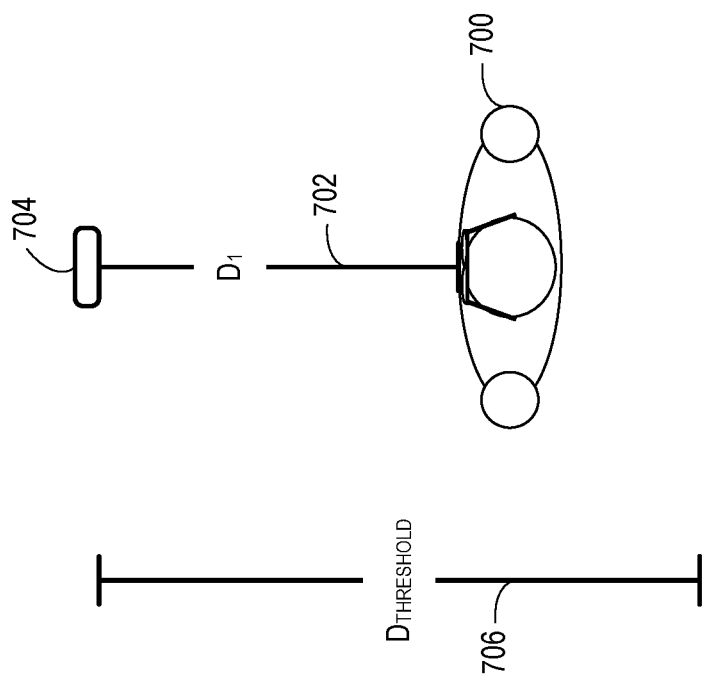
Figure 7B:
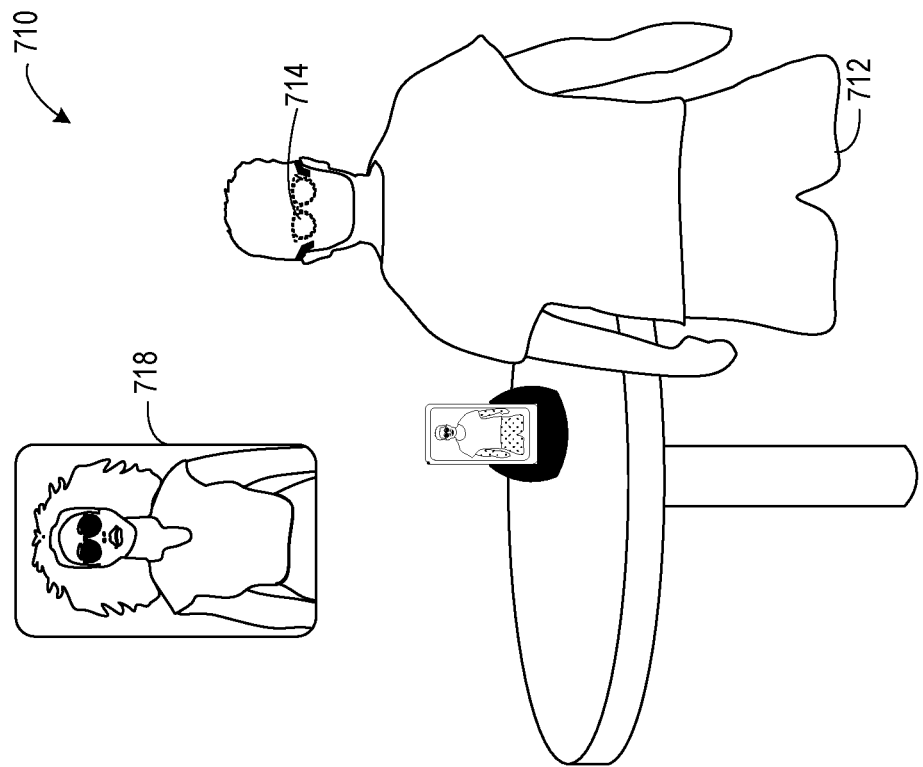
Figure 7B:
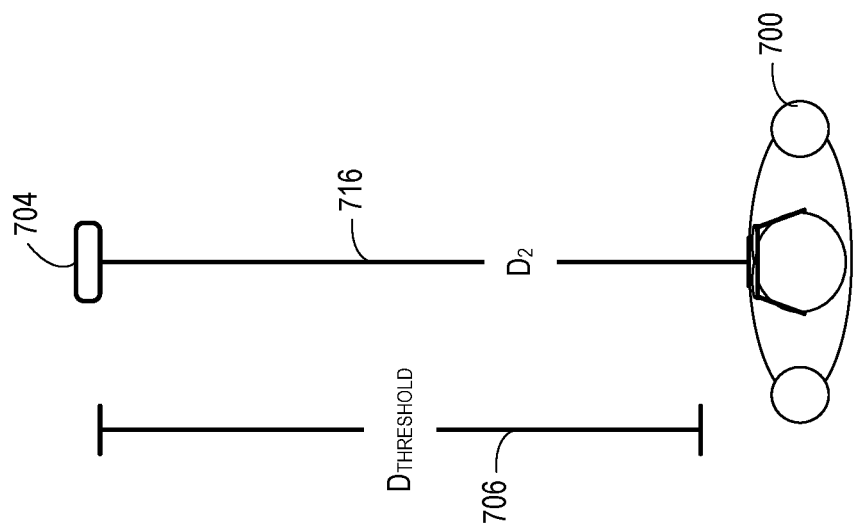

FIGS. 7A and 7B show an example scenario where presentation of an avatar representing a user varies based on a user moving beyond a threshold distance from an imaging device during a mixed reality teleconference. In FIG. 7A, when a first user 700 is positioned a first distance 702 (i.e., $D_1$) from an imaging device 704 that is less than a threshold distance 706 (i.e. $D_{THRESHOLD}$) from the imaging device 704, the imaging resolution of the first user's face may be high enough to produce a detailed three-dimensional point cloud of the first user's face. For example, the distance of the first user 700 from the imaging device 704 may be determined using a depth camera of the imaging device 704. As such, a volumetric three-dimensional avatar 708 of the first user is generated by texture mapping the three-dimensional point cloud of the first user's face onto a three-dimensional body simulation of the first user 700. The avatar 708 is holographically projected into a physical space 710 of a second user 712 that is viewing the avatar 708 on a head-mounted display device 714.

In FIG. 7B, when the first user 700 moves to a position that is a second distance 716 (i.e., $D_2$) from the imaging device 704 that is greater than the threshold distance 706 (i.e. $D_{THRESHOLD}$) from the imaging device 704, the imaging resolution of the first user's face may be reduced to a level not suitable to produce a detailed three-dimensional point cloud of the first user's face. In response to the first user 700 being greater than the threshold distance 706 from the imaging device 704, the avatar 708 (shown in FIG. 7A) is replaced with a two-dimensional representation 718 of the avatar in the video stream. In the illustrated example, the two-dimensional representation 718 of the avatar is depicted as a virtual slate that is holographically projected into the physical space 710 of the second user 712 that is viewing the virtual slate on the head-mounted display device 714. In other examples, the avatar may be replaced with a default avatar in the video stream. The default avatar may have a generic appearance and a generic body simulation that does not follow the actual physical movement of the first user 700. In still other examples, movement of the avatar 718 of the first user 700 may be based on prior image data received before the first user 700 moved beyond the threshold distance from the imaging device 704.

The threshold distance 706 may be set to any suitable distance. In some examples, the threshold distance may depend on the image resolution of the imaging device that is used to image the first user's face.

Figure 8A:
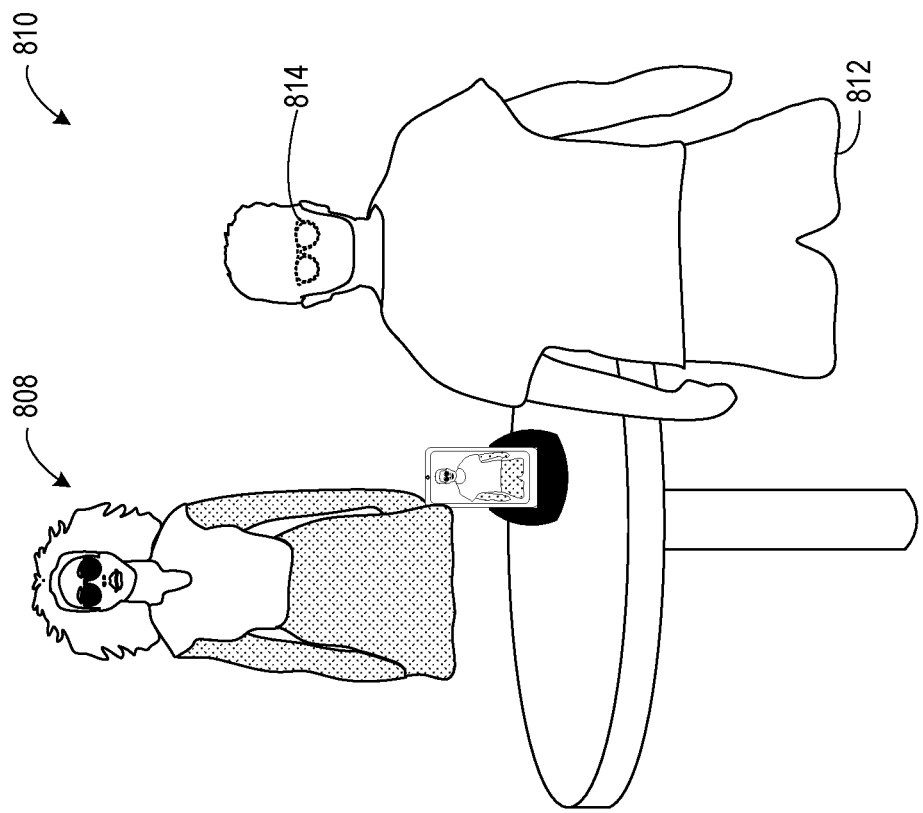
FIGS. 8A and 8B show an example scenario where presentation of an avatar varies based on a user moving out of a field of view of an imaging device during a mixed reality teleconference.
Figure 8A:
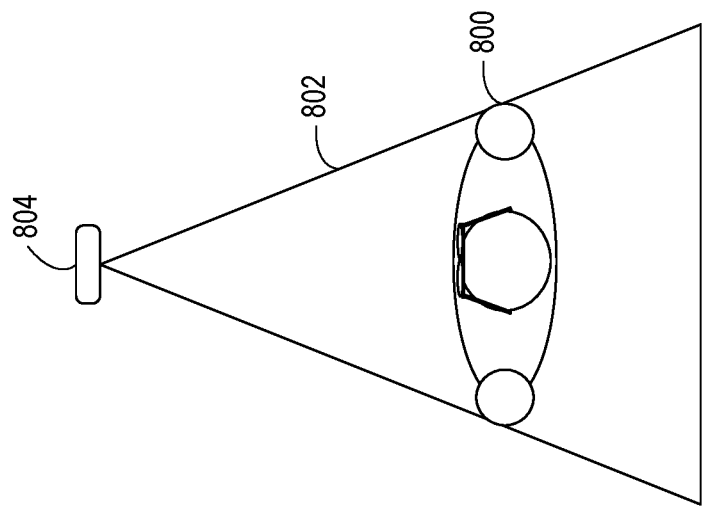
Figure 8B:
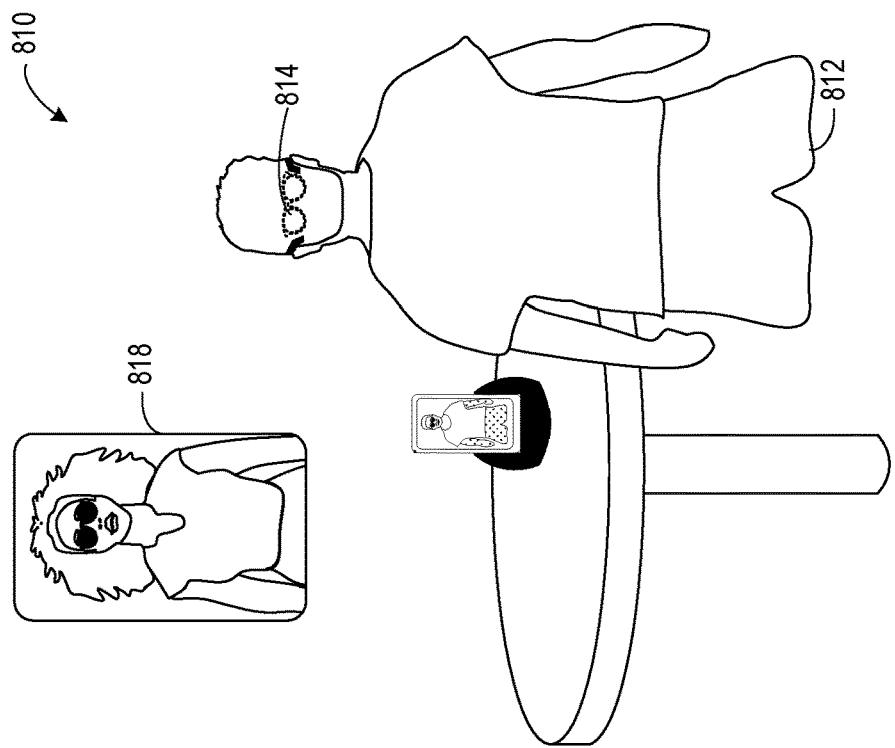
Figure 8B:
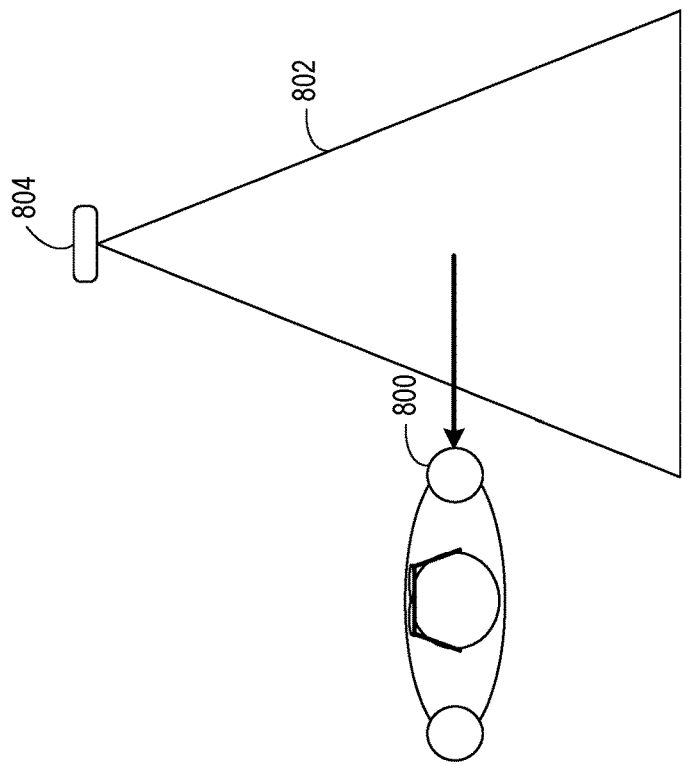

FIGS. 8A and 8B show an example scenario where presentation of an avatar varies based on a user moving out of a field of view of an imaging device during a mixed reality teleconference. In FIG. 8A, when a first user 800 is positioned in a field of view 802 of an imaging device 804, the imaging device 804 images the first user's face 800 and the captured image data is used to generate a detailed three-dimensional point cloud of the first user's face. A volumetric three-dimensional avatar 808 of the first user is generated by texture mapping the three-dimensional point cloud of the first user's face onto a three-dimensional body simulation of the first user 800. The avatar 808 is holographically projected into a physical space 810 of a second user 812 that is viewing the avatar 808 on a head-mounted display device 814.

In FIG. 8B, when the first user 800 moves outside the field of view 802 of the imaging device 804, the imaging device 804 does not image the first user's face an thus does not produce a detailed three-dimensional point cloud of the first user's face. In response to the first user 800 moving outside the field of view 802 of the imaging device 804, the avatar 808 (shown in FIG. 8A) is replaced with a two-dimensional representation 818 of the avatar in the video stream. In the illustrated example, the two-dimensional representation 818 of the avatar is depicted as a virtual slate that is holographically projected into the physical space 810 of the second user 812 that is viewing the virtual slate on the head-mounted display device 814. In other examples, the avatar may be replaced with a default avatar in the video stream. The default avatar may have a generic appearance and a generic body simulation that does not follow the actual physical movement of the first user 800. In still other examples, movement of the avatar of the first user 800 may be based on prior image data received before the first user 800 moved outside the field of view 802 of the imaging device 804.

Figure 9A:
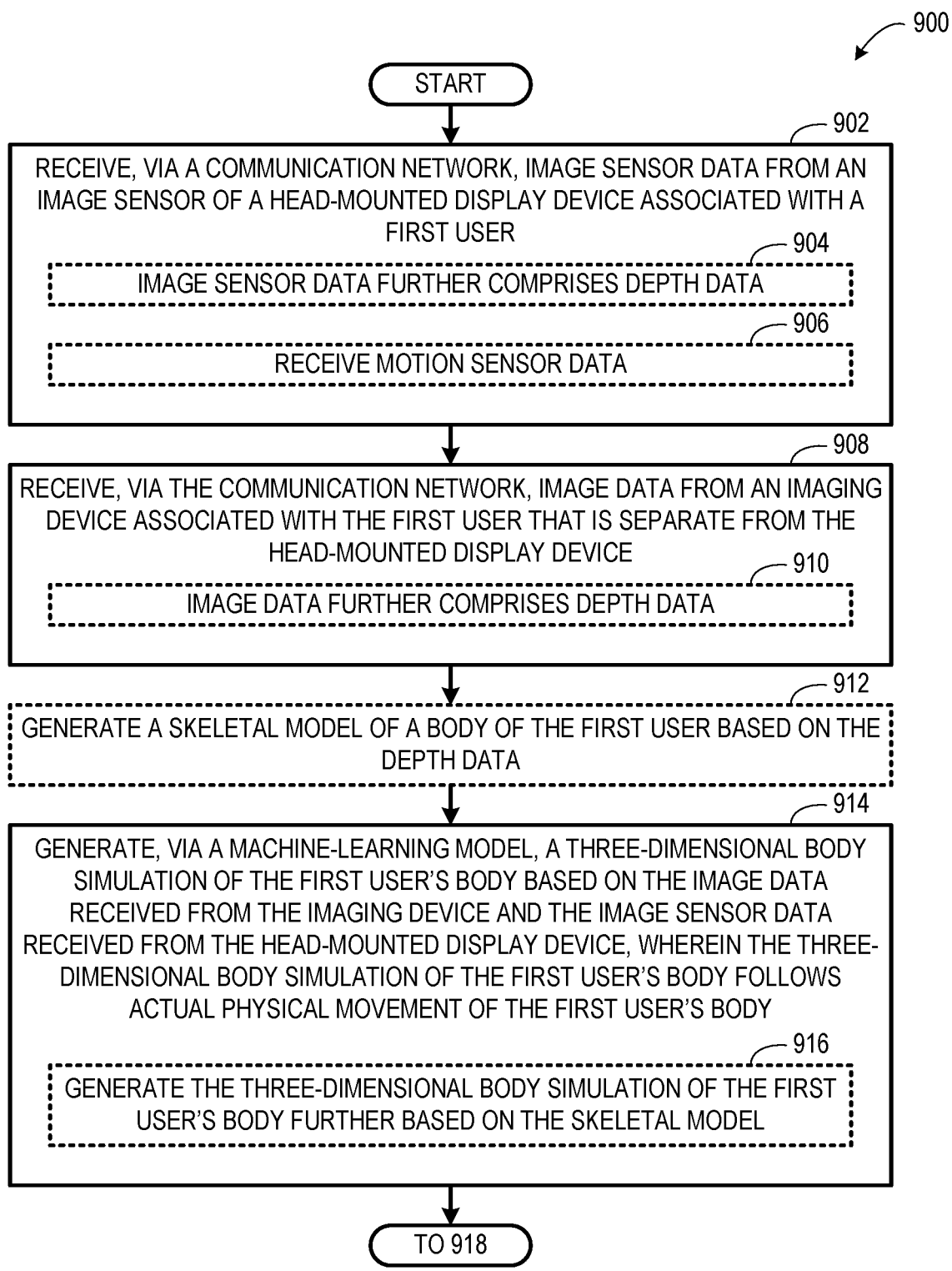
FIGS. 9A-9B show an example method for generating an avatar of a user based on sensor input from a plurality of devices associated with the user.
Figure 9B:
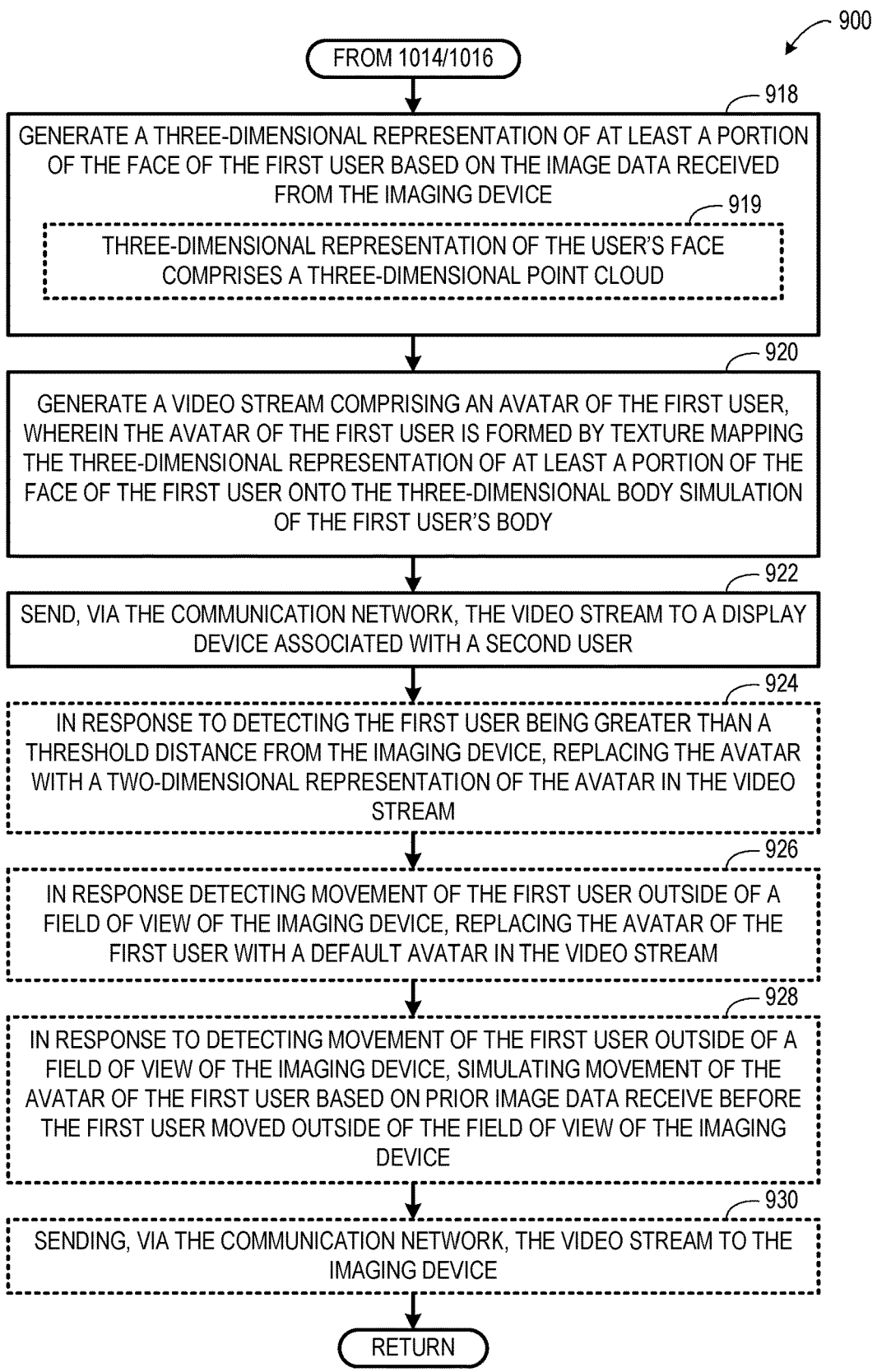

FIGS. 9A-9B show an example method for generating an avatar of a user based on sensor input from a plurality of devices associated with the user. For example, the method may be performed by the remote computing system 200 shown in FIG. 2. In FIG. 9A, at 902, image sensor data is received, via a communication network, from an image sensor of a head-mounted display device associated with a first user. In some examples, at 904, the image sensor data optionally may further comprise depth data obtained by a depth camera of the head-mounted display device. In some examples, at 906, the image sensor data optionally may further comprise motion data. As one example, the motion data may be obtained by a motion sensor, such as an inertial measurement unit. At 908, image data is received, via the communication network, from an imaging device associated with the first user that is separate from the head-mounted display device. In some examples, at 910, the image data optionally may further comprise depth data obtained by a depth camera of the imaging device. In some examples, at 912, a skeletal model of a body of the first user optionally may be generated based on the depth data.

At 914, a three-dimensional body simulation of the first user's body is generated, via a machine-learning model, based on the image data received from the imaging device and the image sensor data received from the head-mounted display device, wherein the three-dimensional body simulation of the first user's body follows actual physical movement of the first user's body. In some examples, at 916, the three-dimensional body simulation of the first user's body optionally may be generated, via a machine-learning model, further based on the skeletal model of the first user's body.

In FIG. 9B, at 918, a three-dimensional representation of at least a portion of the face of the first user is generated based on the image data received from the imaging device. In some examples, at 919, the three-dimensional representation of the user's face optionally may comprise a three-dimensional point cloud. At 920, a video stream comprising an avatar of the first user is generated, wherein the avatar of the first user is formed by texture mapping the three-dimensional representation of at least a portion of the face of the first user onto the three-dimensional body simulation of the first user's body. At 922, the video stream is sent, via the communication network, to a display device associated with a second user. In some examples, at 924, in response to detecting the first user being greater than a threshold distance from the imaging device, the avatar optionally may be replaced with a two-dimensional representation of the avatar in the video stream. In some examples, at 926, in response to detecting movement of the first user outside of a field of view of the imaging device, the avatar of the first user optionally may be replaced with a default avatar in the video stream. In some examples, at 928, in response to detecting movement of the first user outside of a field of view of the imaging device, movement of the avatar of the first user optionally may be simulated based on prior image data receive before the first user moved outside of the field of view of the imaging device. In some examples, at 930, the video stream optionally may be sent, via the communication network, to the imaging device.

The above described method may leverage image data from multiple imaging devices having different perspectives of a user to create a volumetric three-dimensional avatar that conveys real-time facial expressions and gestures of the user.

Figure 10:
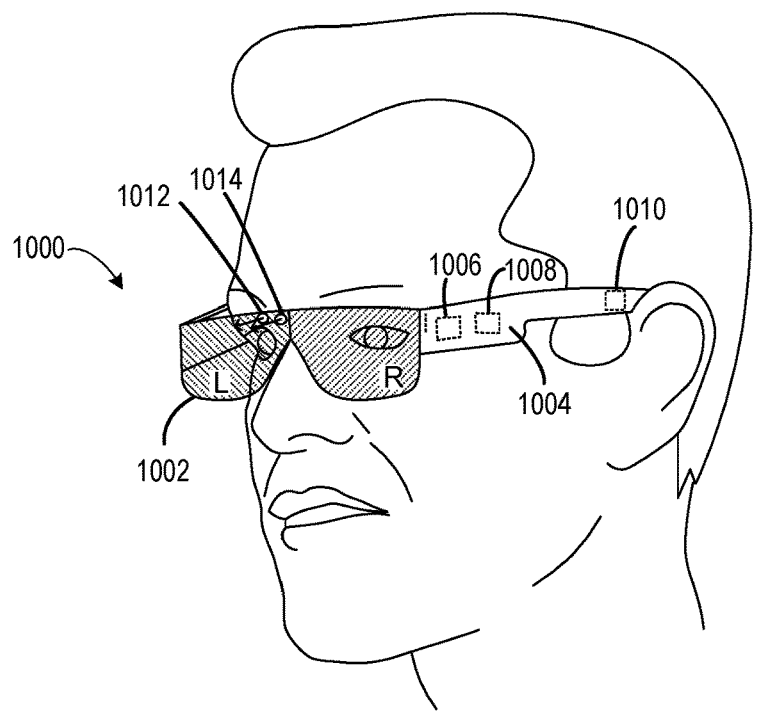
FIG. 10 shows an example head-mounted display device.

As noted above, aspects of the present disclosure may be practiced by a head-mounted display device. The head-mounted display device may take a variety of forms. FIG. 10 shows an example head-mounted display device 1000 including a near-eye display 1002. In some implementations, the head-mounted display device 1000 may take the form of a virtual reality head-mounted display device that includes an opaque, non-see-through near-eye display. In other implementations, the head-mounted display device 1000 may take the form of an augmented reality head-mounted display device that comprises an at least partially transparent near-eye display that is configured to enable a wearer of the augmented reality head-mounted display device to view physical, real-world objects in a physical space through one or more partially transparent pixels displaying virtual object representations. It will be appreciated that the following descriptions of sensors and systems may apply to both the virtual reality head-mounted display device and the augmented reality head-mounted display.

The head-mounted display device 1000 comprises a frame 1004 that wraps around at least a portion of a head of a user to position a display close to the user's eyes. The frame 1004 may support additional components such as, for example, a processor 1006 and associated computer memory 1008. The processor and associated computer memory 1008 may be configured to provide images to the display 1002, to receive sensory signals from input devices, and to enact various control processes and/or other aspects of the methods described herein.

The processor 1006 may include a logic processor and volatile memory and non-volatile storage, as discussed in more detail below with respect to the example computing system 1100 of FIG. 11.

With continued reference to FIG. 10, various suitable display technologies and configurations may be used to display images via the displays of the head-mounted display device 1000. In the example of an augmented reality head-mounted display device, the display 1002 may comprise image-producing elements such as, for example, a liquid crystal on silicon (LCOS) micro display or scanned beam projector, and a see-through waveguide-based or prism-based combiner to deliver virtual images to the user for viewing in combination with the real-world background. Virtual reality displays may utilize similar image-producing elements, but may comprise an opaque enclosure, rather than a transparent combiner.

The display 1002 may include both a left L and right R display in a stereoscopic display configuration. The left L and right R displays each display a view of an augmented reality scene from the perspective of the user's corresponding eye. By viewing the augmented reality scene through the left L and right R displays, the user will perceive virtual objects as being located at particular depths in the real world.

The head-mounted display device 1000 may include various sensors and related systems to provide information to the processor 1006. Such sensors may include an inertial measurement unit (IMU) 1010, one or more outward facing visible light cameras 1012, and one or more outward facing depth cameras 1014. The position and/or orientation of the head-mounted display device 1000 may be assessed relative to the physical environment. In different examples, signals from the IMU 1010, the one or more outward facing visible light cameras 1012, and/or the one or more depth cameras 1014 may be utilized to provide position and/or orientation data to the processor 1006. The one or more outward facing cameras 1012, 1014 may be configured to capture and/or measure physical attributes of the physical space in which the head-mounted display device 1000 resides. Additionally, such image data and/or depth data may be used to generate a three-dimensional body simulation of the user as described herein.

In some implementations, the methods and processes described herein may be tied to a computing system including one or more computing devices. In particular, such methods and processes may be implemented as a computer-application program or service, an application-programming interface (API), a library, and/or other computer-program product.

Figure 11:
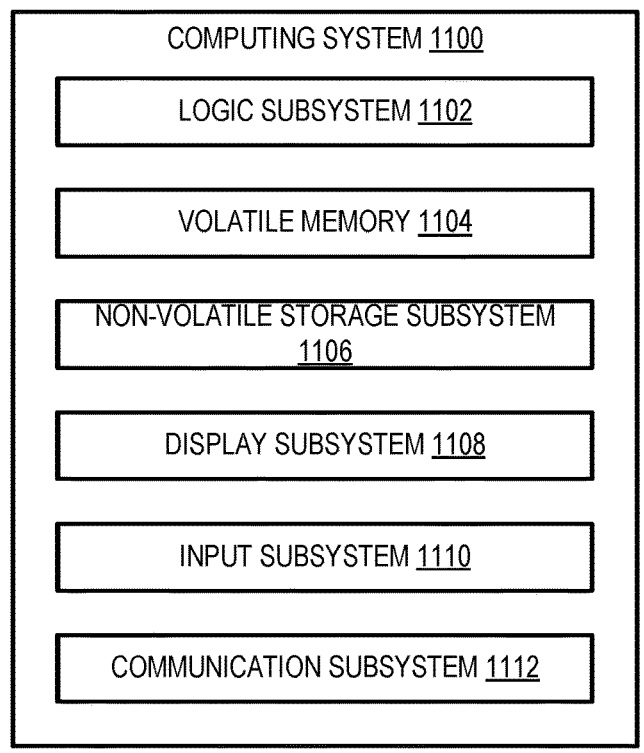
FIG. 11 shows an example computing system.

FIG. 11 schematically shows a non-limiting implementation of a computing system 1100 that can enact one or more of the methods and processes described above. Computing system 1100 is shown in simplified form. For example, the computing system 1100 may embody any of the remote computing system 200, the first head-mounted display device 202, the first imaging/display device 204, the additional imaging device(s) 206, the second head-mounted display device 208, the second imaging/display device 2010, and the additional imaging device(s) 212 described above and illustrated in FIG. 2. Computing system 1100 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 1100 includes a logic subsystem 1102 volatile memory 1104, and a non-volatile storage subsystem 1106. Computing system 1100 may optionally include a display subsystem 1108, input subsystem 1110, communication subsystem 1112, and/or other components not shown in FIG. 11.

Logic subsystem 1102 includes one or more physical devices configured to execute instructions. For example, the logic subsystem may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic subsystem 1102 may include one or more physical processors (hardware) configured to execute software instructions. Additionally or alternatively, the logic subsystem 1102 may include one or more hardware logic circuits or firmware devices configured to execute hardware-implemented logic or firmware instructions. Processors of the logic subsystem 1102 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic subsystem 1102 may be virtualized and executed by remotely accessible, networked computing devices configured in a cloud-computing configuration. In such a case, these virtualized aspects are run on different physical logic processors of various different machines, it will be understood.

Volatile memory 1104 may include physical devices that include random access memory. Volatile memory 1104 is typically utilized by logic subsystem 1102 to temporarily store information during processing of software instructions. It will be appreciated that volatile memory 1104 typically does not continue to store instructions when power is cut to the volatile memory 1104.

Non-volatile storage subsystem 1106 includes one or more physical devices configured to hold instructions executable by the logic subsystem to implement the methods and processes described herein. When such methods and processes are implemented, the state of non-volatile storage subsystem 1106 may be transformed—e.g., to hold different data.

Non-volatile storage subsystem 1106 may include physical devices that are removable and/or built in. Non-volatile storage subsystem 1106 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage subsystem 1106 may include nonvolatile, dynamic, static, read/write, read-only, sequential-access, location-addressable, file-addressable, and/or content-addressable devices. It will be appreciated that non-volatile storage subsystem 1106 is configured to hold instructions even when power is cut to the non-volatile storage subsystem 1106.

Aspects of logic subsystem 1102, volatile memory 1104, and non-volatile storage subsystem 1106 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 1108 may be used to present a visual representation of data held by non-volatile storage device 1106. The visual representation may take the form of a graphical user interface (GUI). As the herein described methods and processes change the data held by the non-volatile storage device, and thus transform the state of the non-volatile storage device, the state of display subsystem 1108 may likewise be transformed to visually represent changes in the underlying data. Display subsystem 1108 may include one or more display devices utilizing virtually any type of technology. Such display devices may be combined with logic subsystem 1102, volatile memory 1104, and/or non-volatile storage subsystem 1106 in a shared enclosure, or such display devices may be peripheral display devices.

When included, input subsystem 1110 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 1112 may be configured to communicatively couple various computing devices described herein with each other, and with other devices. Communication subsystem 1112 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 1100 to send and/or receive messages to and/or from other devices via a network such as the Internet.

In an example, a method performed by a computing system comprises receiving, via a communication network, image sensor data from an image sensor of a head-mounted display device associated with a first user, receiving, via the communication network, image data from an imaging device associated with the first user that is separate from the head-mounted display device, generating, via a machine-learning model, a three-dimensional body simulation of the first user's body based on the image data received from the imaging device and the image sensor data received from the head-mounted display device, wherein the three-dimensional body simulation of the first user's body follows actual physical movement of the first user's body, generating a three-dimensional representation of at least a portion of the face of the first user based on the image data received from the imaging device, generating a video stream comprising an avatar of the first user, wherein the avatar of the first user is formed by texture mapping the three-dimensional representation of at least a portion of the face of the first user onto the three-dimensional body simulation of the first user's body, and sending, via the communication network, the video stream to a display device associated with a second user. In this example and/or other examples, the imaging device optionally may further comprise a depth camera, the image data optionally may further comprise depth data, the display device optionally may comprise a head-mounted display device, and the video stream optionally may be generated such that the avatar is configured to appear holographically projected into a physical space of the second user when visually presented on the head-mounted display device associated with the second user. In this example and/or other examples, the imaging device optionally may further comprise a depth camera, the image data optionally may further comprise depth data, and wherein the method optionally may comprise generating a skeletal model of a body of the first user based on the depth data, wherein the three-dimensional body simulation is generated, via the machine-learning model, further based on the skeletal model of the body of the first user. In this example and/or other examples, the imaging device optionally may further comprise a depth camera, the image data optionally may further comprise depth data of a physical space of the first user, and motion of the avatar in the video stream optionally may be bound by spatial limitations of the physical space of the first user that is determined based on the depth data. In this example and/or other examples, the method optionally may further comprise in response to detecting the first user being greater than a threshold distance from the imaging device, replacing the avatar with a two-dimensional representation of the avatar in the video stream. In this example and/or other examples, a second head-mounted display device separate from the display device optionally may be associated with the second user, and the method optionally may further comprise automatically sending, via the communication network, the video stream to the second head-mounted display device in response to receiving an indication of activation of the second head-mounted display device. In this example and/or other examples, the method optionally may further comprise in response to detecting movement of the first user outside of a field of view of the imaging device, replacing the avatar of the first user with a default avatar in the video stream. In this example and/or other examples, the method optionally may further comprise in response to detecting movement of the first user outside of a field of view of the imaging device, simulating movement of the avatar of the first user based on prior image data receive before the first user moved outside of the field of view of the imaging device. In this example and/or other examples, the method optionally may further comprise sending, via the communication network, the video stream to the imaging device. In this example and/or other examples, the three-dimensional representation of at least a portion of the face of the first user optionally may comprise a volumetric point cloud.

In another example, a computing system comprises a logic subsystem, a storage subsystem comprising instructions executable by the logic subsystem to receive, via a communication network, image sensor data from an image sensor of a head-mounted display device associated with a first user, receive, via the communication network, image data from an imaging device associated with the first user that is separate from the head-mounted display device, generate, via a machine-learning model, a three-dimensional body simulation of the first user's body based on the image data received from the imaging device and the image sensor data received from the head-mounted display device, wherein the three-dimensional body simulation of the first user's body follows actual physical movement of the first user's body, generate a three-dimensional representation of at least a portion of the face of the first user based on the image data received from the imaging device, generate a video stream comprising an avatar of the first user, wherein the avatar of the first user is formed by texture mapping the three-dimensional representation of at least a portion of the face of the first user onto the three-dimensional body simulation of the first user's body, and send, via the communication network, the video stream to a display device associated with a second user. In this example and/or other examples, the imaging device optionally may further comprise a depth camera, the image data optionally may further comprise depth data, the display device optionally may comprise a head-mounted display device, and the video stream optionally may be generated such that the avatar is configured to appear holographically projected into a physical space of the second user when visually presented on the head-mounted display device associated with the second user. In this example and/or other examples, the imaging device optionally may further comprise a depth camera, the image data optionally may further comprise depth data, and the instructions optionally may be further executable by the logic subsystem to generate a skeletal model of a body of the first user based on the depth data, the three-dimensional body simulation optionally may be generated, via the machine-learning model, further based on the skeletal model of the body of the first user. In this example and/or other examples, the imaging device optionally may further comprise a depth camera, the image data optionally may further comprise depth data of a physical space of the first user, and motion of the avatar in the video stream optionally may be bound by spatial limitations of the physical space of the first user that is determined based on the depth data. In this example and/or other examples, the instructions optionally may be further executable by the logic subsystem to in response to detecting the first user being greater than a threshold distance from the imaging device, replacing the avatar with a two-dimensional representation of the avatar in the video stream. In this example and/or other examples, the second head-mounted display device separate from the display device optionally may be associated with the second user, and the instructions optionally may be further executable by the logic subsystem to automatically send, via the communication network, the video stream to the second head-mounted display device in response to receiving an indication of activation of the second head-mounted display device. In this example and/or other examples, the instructions optionally may be further executable by the logic subsystem to, in response to detecting a movement of the first user outside of a field of view of the imaging device, replace the avatar of the first user with a default avatar in the video stream. In this example and/or other examples, the instructions optionally may be further executable by the logic subsystem to, in response to detecting movement of the first user outside of a field of view of the imaging device, simulate movement of the avatar of the first user based on prior image data receive before the first user moved outside of the field of view of the imaging device. In this example and/or other examples, the three-dimensional representation of at least a portion of the face of the first user optionally may comprise a volumetric point cloud.

In yet another example, a method performed by a computing system comprises receiving, via a communication network, image sensor data from an image sensor of a head-mounted display device associated with a first user, receiving, via the communication network, image data from an imaging device associated with the first user that is separate from the head-mounted display device, generating, via a machine-learning model, a three-dimensional body simulation of the first user's body based on the image data received from the imaging device and the image sensor data received from the head-mounted display device, wherein the three-dimensional body simulation of the first user's body follows actual physical movement of the first user's body, generating a three-dimensional point cloud of at least a portion of the face of the first user based on the image data received from the imaging device, generating a video stream comprising an avatar of the first user, wherein the avatar of the first user is formed by texture mapping the three-dimensional point cloud of at least a portion of the face of the first user onto the three-dimensional body simulation of the first user's body, and sending, via the communication network, the video stream to a second head-mounted display device associated with a second user.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method performed by a computing system, the method comprising:
   receiving, via a communication network, image sensor data from an outward-facing image sensor of a head-mounted display device associated with a first user;
   receiving, via the communication network, image data from an imaging device associated with the first user that is separate from the head-mounted display device;
   generating, via a machine-learning model, a three-dimensional body simulation of the first user's body based on the image data received from the imaging device and the image sensor data received from the head-mounted display device, wherein the three-dimensional body simulation of the first user's body follows actual physical movement of the first user's body;
   generating a three-dimensional representation of at least a portion of the face of the first user based on the image data received from the imaging device;
   generating a video stream comprising an avatar of the first user, wherein the avatar of the first user is formed by texture mapping the three-dimensional representation of at least a portion of the face of the first user onto the three-dimensional body simulation of the first user's body;
   sending, via the communication network, the video stream to a display device associated with a second user;
   receiving an indication of activation of a second head-mounted display device associated with the second user; and
   automatically sending, via the communication network, the video stream to the second head-mounted display device instead of the display device associated with the second user based on receiving the indication of activation of the second head-mounted display device.

2. The method of claim 1, wherein the imaging device further comprises a depth camera, wherein the image data further comprises depth data, wherein the display device comprises a head-mounted display device, and wherein the video stream is generated such that the avatar is configured to appear holographically projected into a physical space of the second user when visually presented on the head-mounted display device associated with the second user.

3. The method of claim 1, wherein the imaging device further comprises a depth camera, where the image data further comprises depth data, and wherein the method comprises:
   generating a skeletal model of a body of the first user based on the depth data, wherein the three-dimensional body simulation is generated, via the machine-learning model, further based on the skeletal model of the body of the first user.

4. The method of claim 1, wherein the imaging device further comprises a depth camera, where the image data further comprises depth data of a physical space of the first user, and wherein motion of a avatar in the video stream is bound by spatial limitations of the physical space of the first user that is determined based on the depth data.

5. The method of claim 1, further comprising:
   in response to detecting the first user being greater than a threshold distance from the imaging device, replacing the avatar with a two-dimensional representation of the avatar in the video stream.

6. The method of claim 1, further comprising:
   in response to detecting movement of the first user outside of a field of view of the imaging device, replacing the avatar of the first user with a default avatar in the video stream.

7. The method of claim 1, further comprising:
   in response to detecting movement of the first user outside of a field of view of the imaging device, simulating movement of the avatar of the first user based on prior image data receive before the first user moved outside of the field of view of the imaging device.

8. The method of claim 1, wherein the method further comprises sending, via the communication network, the video stream to the imaging device.

9. The method of claim 1, wherein the three-dimensional representation of at least a portion of the face of the first user comprises a volumetric point cloud.

10. A computing system comprising:
    a logic subsystem;
    a storage subsystem comprising instructions executable by the logic subsystem to:
      receive, via a communication network, image sensor data from an outward-facing image sensor of a head-mounted display device associated with a first user;
      receive, via the communication network, image data from an imaging device associated with the first user that is separate from the head-mounted display device;
      generate, via a machine-learning model, a three-dimensional body simulation of the first user's body based on the image data received from the imaging device and the image sensor data received from the head-mounted display device, wherein the three-dimensional body simulation of the first user's body follows actual physical movement of the first user's body;
      generate a three-dimensional representation of at least a portion of the face of the first user based on the image data received from the imaging device;
      generate a video stream comprising an avatar of the first user, wherein the avatar of the first user is formed by texture mapping the three-dimensional representation of at least a portion of the face of the first user onto the three-dimensional body simulation of the first user's body;
      send, via the communication network, the video stream to a display device associated with a second user;
      receive an indication of activation of a second head-mounted display device associated with the second user; and
      automatically send, via the communication network, the video stream to the second head-mounted display device instead of the display device associated with the second user based on receiving the indication of activation of the second head-mounted display device.

11. The computing system of claim 10, wherein the imaging device further comprises a depth camera, wherein the image data further comprises depth data, wherein the display device comprises a head-mounted display device, and wherein the video stream is generated such that the avatar is configured to appear holographically projected into a physical space of the second user when visually presented on the head-mounted display device associated with the second user.

12. The computing system of claim 10, wherein the imaging device further comprises a depth camera, where the image data further comprises depth data, and wherein the instructions are further executable by the logic subsystem to generate a skeletal model of a body of the first user based on the depth data, wherein the three-dimensional body simulation is generated, via the machine-learning model, further based on the skeletal model of the body of the first user.

13. The computing system of claim 10, wherein the imaging device further comprises a depth camera, where the image data further comprises depth data of a physical space of the first user, and wherein motion of the avatar in the video stream is bound by spatial limitations of the physical space of the first user that is determined based on the depth data.

14. The computing system of claim 10, wherein the instructions are further executable by the logic subsystem to in response to detecting the first user being greater than a threshold distance from the imaging device, replacing the avatar with a two-dimensional representation of the avatar in the video stream.

15. The computing system of claim 10, wherein the instructions are further executable by the logic subsystem to, in response to detecting a movement of the first user outside of a field of view of the imaging device, replace the avatar of the first user with a default avatar in the video stream.

16. The computing system of claim 10, wherein the instructions are further executable by the logic subsystem to, in response to detecting movement of the first user outside of a field of view of the imaging device, simulate movement of the avatar of the first user based on prior image data receive before the first user moved outside of the field of view of the imaging device.

17. The computing system of claim 10, wherein the three-dimensional representation of at least a portion of the face of the first user comprises a volumetric point cloud.

18. A method performed by a computing system, the method comprising:
   receiving, via a communication network, image sensor data from an outward-facing image sensor of a head-mounted display device associated with a first user;
   receiving, via the communication network, image data from an imaging device associated with the first user that is separate from the head-mounted display device;
   generating, via a machine-learning model, a three-dimensional body simulation of the first user's body based on the image data received from the imaging device and the image sensor data received from the head-mounted display device, wherein the three-dimensional body simulation of the first user's body follows actual physical movement of the first user's body;
   generating a three-dimensional point cloud of at least a portion of the face of the first user based on the image data received from the imaging device;
   generating a video stream comprising an avatar of the first user, wherein the avatar of the first user is formed by texture mapping the three-dimensional point cloud of at least a portion of the face of the first user onto the three-dimensional body simulation of the first user's body;
   sending, via the communication network, the video stream to a display device associated with a second user;
   receiving an indication of activation of a second head-mounted display device associated with the second user; and
   automatically sending, via the communication network, the video stream to the second head-mounted display device instead of the display device associated with the second user based on receiving the indication of activation of the second head-mounted display device.

* * * * *